United States Patent [19]

Bjorkman, Jr.

[11] 4,389,468
[45] Jun. 21, 1983

[54] METAL HALOGEN BATTERY SYSTEM WITH MULTIPLE OUTLET NOZZLE FOR HYDRATE

[75] Inventor: Harry K. Bjorkman, Jr., Birmingham, Mich.

[73] Assignee: Energy Development Associates, Inc., Madison Heights, Mich.

[21] Appl. No.: 358,628

[22] Filed: Mar. 16, 1982

[51] Int. Cl.³ .............................................. H01M 2/40
[52] U.S. Cl. ..................................... 429/70; 429/105; 429/199
[58] Field of Search .................. 429/101, 105, 199, 70

[56] References Cited

U.S. PATENT DOCUMENTS

| | | | |
|---|---|---|---|
| 3,713,888 | 1/1973 | Symons | 136/6 |
| 3,809,578 | 5/1974 | Symons | 136/6 E |
| 3,814,630 | 6/1974 | Bjorkman, Jr. | 136/86 A |

Primary Examiner—Charles F. LeFevour
Attorney, Agent, or Firm—Harness, Dickey & Pierce

[57] ABSTRACT

A metal halogen battery system, including at least one cell having a positive electrode and a negative electrode contacted by aqueous electrolyte containing the material of said metal and halogen, store means whereby halogen hydrate is formed and stored as part of an aqueous material, means for circulating electrolyte through the cell and to the store means, and conduit means for transmitting halogen gas formed in the cell to a hydrate former whereby the hydrate is formed in association with the store means, said store means being constructed in the form of a container which includes a filter means, said filter means being inoperative to separate the hydrate formed from the electrolyte, said system having, a hydrate former pump means associated with the store means and being operative to intermix halogen gas with aqueous electrolyte to form halogen hydrate, said hydrate former means including, multiple outlet nozzle means connected with the outlet side of said pump means and being operative to minimize plugging, said nozzle means being comprised of at least one divider means which is generally perpendicular to the rotational axes of gears within the pump means, said divider means acting to divide the flow from the pump means into multiple outlet flow paths.

5 Claims, 5 Drawing Figures

METAL HALOGEN BATTERY SYSTEM WITH MULTIPLE OUTLET NOZZLE FOR HYDRATE

The Government of the United States of America has rights in this invention pursuant to Contract No. DE-AC02-76ET20131 awarded by the U.S. Department of Energy.

BACKGROUND OF THE INVENTION

The present invention relates to improvements in metal halogen battery systems. More particularly the invention relates to a new multiple outlet nozzle means for use in connection with the hydrate former associated with the hydrate store of the battery system.

The electrical energy storage systems of the type referred to herein (e.g., a zinc chloride battery system or other metal-halogen battery system) utilize a halogen hydrate as the source of a halogen component for reduction at a normally positive electrode, and an oxidizable metal adapted to become oxidized at a normally negative electrode during the normal discharge of the storage system. An aqueous electrolyte is employed for replenishing the supply of the halogen components as it becomes reduced at the positive electrode. The electrolyte contains the dissolved ions of the oxidized metal and the reduced halogen and is circulated between the electrode area and a storage area containing halogen hydrate, which progressively decomposes during a normal discharge of the electrical energy system, liberating additional elemental halogen to be consumed at the positive electrode.

The state of the art in electrical energy storage systems or battery systems of this type is described in the following cited references owned by the same assignee as the present invention, such as Symons U.S. Pat. No. 3,713,888; Symons U.S. Pat. No. 3,809,578 entitled "Process for Forming and Storing Halogen Hydrate in a Battery"; and Bjorkman U.S. Pat. No. 3,814,630 entitled "Filter/Store For Electric Energy Storage Device"; and, in commonly assigned copending Bjorkman U.S. patent application Ser. No. 368,892, filed Apr. 16, 1982, entitled "Multiple Stage Multiple Filter Hydrate Store".

The specific teachings of the aforementioned cited references are incorporated herein by reference. The new multiple outlet nozzle disclosed herein is particularly useful for application in a battery system of the type described in the copending application referred to immediately above. However, it also has wide application for use in numerous metal halogen battery systems.

The basic operation of a zinc chloride battery system is as follows. In charge, an electrolyte pump delivers aqueous electrolyte to pockets between pairs of porous graphite-chlorine electrodes in a battery stack comprised of a plurality of cells. The electrolyte passes through the porous chlorine electrodes into a chamber between opposite polarity electrodes, flows up between the electrodes, then flows back into the battery sump. Chlorine gas liberated from porous graphite electrode substrates is pumped by a gear pump, otherwise referred to as the gas pump, and before entering the gas pump, the chlorine is mixed with electrolyte chilled by a chiller unit. The chlorine and chilled electrolyte are mixed in the gear pump, chlorine hydrate forms, and the chlorine hydrate-electrolyte mixture is deposited in the store. In discharge, chlorine is liberated from hydrate by decomposition of chlorine hydrate in the store by injection of warm electrolyte from the sump. On development of the required chlorine gas pressure in the store, the chlorine is injected and mixed with and dissolved in the electrolyte, which is then fed to the porous electrodes in the battery stack. The battery stack is then discharged, wherein the electrode dissolution of zinc occurs at the zinc electrode, reduction of the dissolved chlorine occurs at the chlorine electrode, power is available from the battery terminals, and zinc chloride is formed in the electrolyte by reaction of zinc and chlorine to form zinc chloride.

The state of the prior art has been to use a single nozzle outlet from the gear pump used to form chlorine hydrate in a zinc-chlorine battery system. Chlorine gas and cold liquid electrolyte were mixed in the pump causing solid particulate chlorine hydrate to be formed. The mixture of electrolyte, particulate hydrate and unreacted gas was expelled into a tank filter (container lined with filter cloth) called the "Hydrate Store". In many battery systems, however, as the battery charge progressed, the particulate hydrate gradually filled the available space with a loosely packed bed of particulate material. The filtration process began to "back up" into the single nozzle outlet where the liquid velocities were much higher than in the relatively large volume of the tank. The result in many instances has been premature, rapid buildup of high pressures in the pump outlet, even though the store volume was not fully packed with particulate hydrate. If the gear pump were turned off for a period of time, the nozzle would often clear, and operation could be resumed. However, as can be appreciated a shut-down of the pump is time consuming and very detrimental to efficient continuous running of the battery.

Accordingly it is a primary object of this invention to provide a novel metal halogen battery system which includes an improved hydrate former which minimizes hydrate plugging.

Other objects, features and advantages of the invention will become apparent from the description herein, from the drawings, and from the appended claims.

SUMMARY OF THE INVENTION

The invention concerns a metal halogen battery system wherein there is utilized a properly contoured multiple outlet nozzle in the hydrate forming portion of the system. With this type of multiple outlet nozzle, when one of the nozzle outlets becomes plugged, the other outlets continue to flow at slightly elevated pressure until the plugged outlet, now operating under positive pressure but significantly reduced flow, can clear. The multiple outlet nozzles also allow the discharge to be distributed within the hydrate store, which in cases where the store is elongated or unusual in shape is important to obtaining optimum or best hydrate packing.

DESCRIPTION OF THE INVENTION

Figure 1:
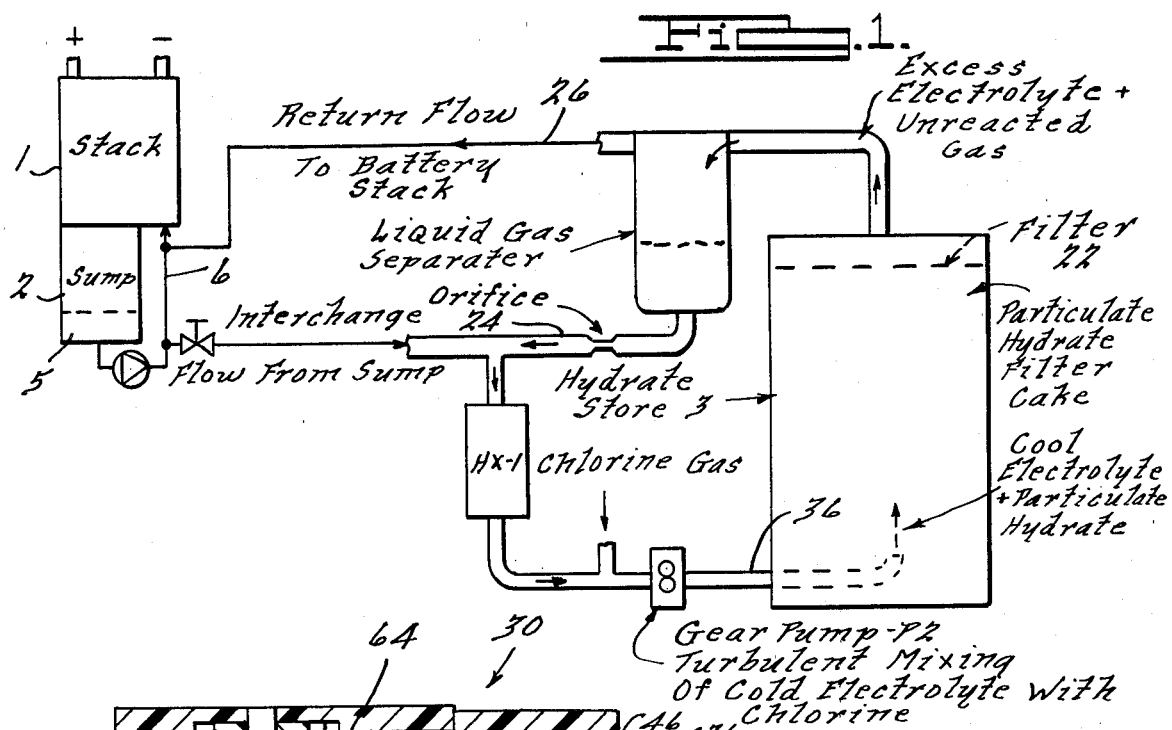
FIG. 1 illustrates a simplified schematic of a metal halogen battery system in which the invention is used.

The drawing FIG. 1 illustrates a schematic of a zinc-chlorine battery system wherein means are provided to achieve the desired flows of chlorine, electrolyte, and heat. The zinc-chloride battery consists of three basic parts, the stack, the sump, and the store, as shown in FIG. 1. The stack 1 consists of a plurality of cells made up, for example, of solid-graphite zinc electrodes and porous-graphite chlorine electrodes. The sump is designated 2 and is comprised of an electrolyte reservoir 5 and the electrolyte pump P-1 to circulate the electrolyte.

The halogen hydrate store means is designated 3 and includes a gas pump P-2 and a filter means 22. The store functions to store the chlorine reactant in the form of chlorine hydrate, which is a brilliant yellow solid that decomposes to chlorine gas and electrolyte at temperatures above 9.6° C. at ambient atmospheric pressure.

The centrifugal pump P-1 circulates the electrolyte from the reservoir 5 to the individual porous electrodes (not shown) in the stack through the conduit 6, from which electrolyte eventually returns to the reservoir.

The invention herein concerns a properly contoured specially constructed multiple outlet nozzle, with the outlets being in parallel, instead of a single nozzle forming the pump discharge. With this type of multiple outlet, it has been discovered that when one of the nozzle outlets plugs, the other nozzles will continue to flow at slightly elevated pressure until the plugged outlet, now operating under positive pressure but greatly reduced flow, can clear. The multiple outlet nozzles also allow the discharge to be distributed to different desired areas within the hydrate store, which in cases where the store is elongated or unusual in shape can be highly important to achieving the best hydrate packing.

Figure 2:
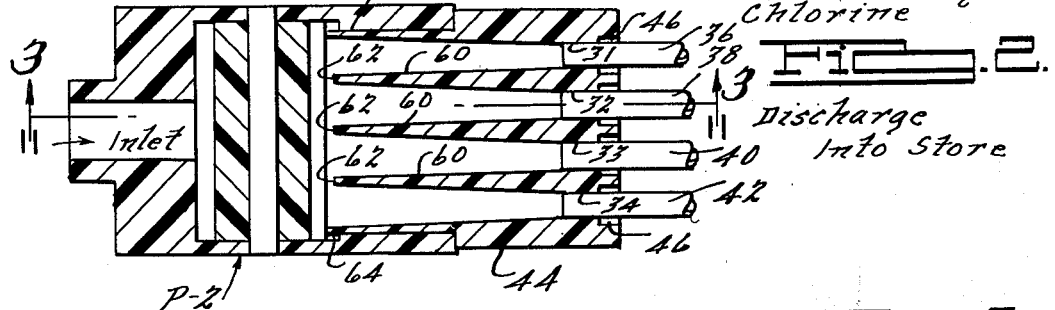
FIG. 2 illustrates a horizontal cross-section through the gear pump showing a multiple outlet nozzle, i.e., with four outlets.
Figure 3:
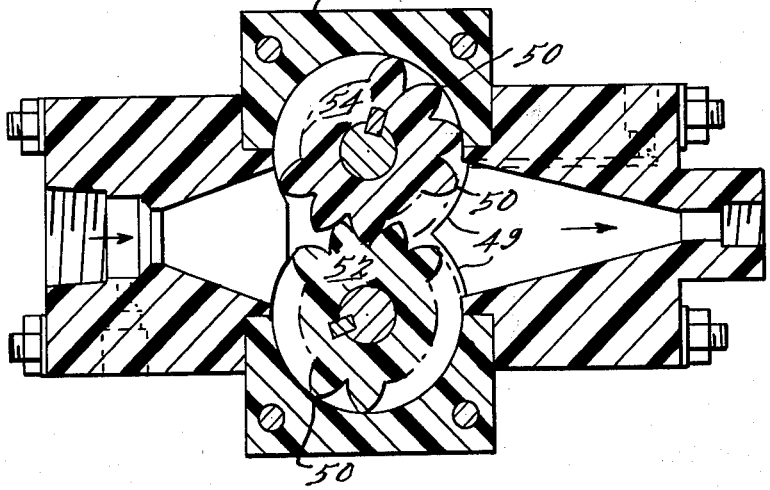
FIG. 3 illustrates a cross-section view through the gear pump taken along the line 3—3 in FIG. 2.
Figure 4A:
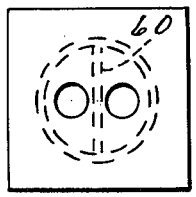
FIG. 4(a) illustrates another embodiment of a multiple outlet nozzle in accordance with the invention which has two outlets; and, FIG. 4(b) a side view of the multiple outlet nozzle of FIG. 4(a).
Figure 4B:
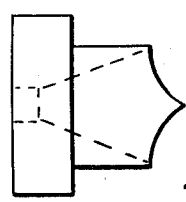

A simplified schematic of the battery system in which the invention is used is shown in FIG. 1. The subsystem of a gear pump and multiple outlet nozzle means is shown in FIG. 2. In the system of FIG. 1, electrolyte is cooled in a heat exchanger HX-1, mixed in a gear pump P-2 with chlorine gas from the battery stack 1 to form solid, finely divided, particulate hydrate and then passed through the hydrate store 3 which includes a filter 22 to separate the particulate hydrate from the excess electrolyte. A major portion of this excess electrolyte, which is now slightly increased in salt concentration because water has been removed in the hydrate formation process, is mixed with a quantity of electrolyte from the battery stack subsystem and recycled via conduit 24 through the heat exchanger HX-1. The remainder is recirculated back to the battery stack via conduit 26. The multiple outlet nozzle 30, subject of this invention, is located at the outlet of the gear pump designated P-2. A more detailed view of the nozzle means is shown in FIGS. 2-3. The particular multiple outlet nozzle 30 shown is a four port version, although the concept can be applied in two and three port versions and may be applied to versions having a still larger number of ports, with the maximum number being determined by the design of the gear pump being used.

The multiple ports 31,32,33,34 are discharged through tubes 36,38,40,42 affixed to the block 44 and fitting into recesses 46 machined into the block so as to provide a smooth transition between the nozzle 30 and the discharge ports 31,32,33,34. In connection with the ports or tubes being used, care must be taken to avoid protruding ridges or burrs which will collect hydrate particles and begin, by hydrate crystallization from the supersaturated solution, to form a plug of the nozzle at the point of connection between the tube and nozzle block 44.

The fit of the outlet port into the pump housing 48 is shown in more detail in FIG. 3. The entry zone of the outlet nozzle extends, for example, to within approximately 0.05" to 0.07" of the surface of revolution designated 49 of the tips 50 of the gears 52,54. The nozzle ports are separated by vertical blades or dividers 60 (see FIG. 2) which also extend to the surface 49. The tips 62 of the inner blades are preferably removed or cut back a short distance from the tip sufficient to permit better hydraulic flow down the length of the gears, but not so far away from the turbulence of the surface 49 of gear revolution to create an edge upon which hydrate buildup can begin and propagate. The dividers 60 may also be recessed from the surface 49 of gear revolution in other ways which meet the above criteria. The blades 64 at either outer edge of the nozzle 30 are normally allowed to extend fully to the gear tips 50 to reduce flow off of the end of the gears.

With respect to FIG. 2, the action of the nozzle 30 is such that if the outlet 34 becomes plugged, the flow is diverted through the other outlets 31,32,33. This also permits outlet 34 in many instances to eventually carry out a self-clearing action when turbulence, etc., in the rest of the store 21 causes the plugged hydrate to break loose. It should be noted that each nozzle outlet should possess no more than about a 20° slope per side.

While it will be apparent that the preferred embodiments of the invention disclosed are well calculated to fulfill the objects, benefits, and advantages of the invention, it will be appreciated that the invention is susceptible to modification, variation and change without departing from the proper scope or fair meaning of the subjoined claims.

What is claimed is:

1. In a metal halogen battery system, including at least one cell having a positive electrode and a negative electrode contacted by aqueous electrolyte containing the material of said metal and halogen, store means whereby halogen hydrate is formed and stored as part of an aqueous material, means for circulating electrolyte through the cell and to the store means, and conduit means for transmitting halogen gas formed in the cell to a hydrate former whereby the hydrate is formed in association with the store means, said store means being constructed in the form of a container which includes a filter means, said filter means being operative to separate the hydrate formed from the electrolyte, the improvement comprising, a hydrate former pump means associated with the store means and being operative to intermix halogen gas with aqueous electrolyte to form halogen hydrate, said hydrate former means including, multiple outlet nozzle means connected with the outlet side of said pump means and being operative to minimize plugging, said nozzle means being comprised of at least one divider means which is generally perpendicular to rotational axes of gears within the pump means, said divider means acting to divide the flow from the pump means into multiple outlet flow paths.

2. The invention of claim 1 wherein, the divider means is comprised of at least one blade member which has a tip portion thereof protruding into a space formed by the rotating gears, and said tip portion is at least partially cut away to improve the hydraulic unloading of fluid being pumped through the gears.

3. The invention of claim 1 wherein, each nozzle outlet possesses no more than about a 20° slope per side.

4. The invention of claim 1 wherein, said battery is a zinc-chlorine battery using an aqueous zinc chloride electrolyte.

5. The invention of claim 4 wherein, the divider means is comprised of at least one blade member which has a tip portion thereof protruding into a space formed by the rotating gears, and said tip portion is at least partially cut away to improve the hydraulic unloading of fluid being pumped through the gears, each nozzle outlet possesses no more than about a 20° slope per side.

* * * * *

UNITED STATES PATENT AND TRADEMARK OFFICE
CERTIFICATE OF CORRECTION

PATENT NO. : 4,389,468
DATED : June 21, 1983
INVENTOR(S) : Harry K. Bjorkman, Jr.

It is certified that error appears in the above-identified patent and that said Letters Patent is hereby corrected as shown below:

Abstract, line 11, "inoperative" should be --operative--.

Signed and Sealed this

Fifteenth Day of November 1983

[SEAL]

Attest:

GERALD J. MOSSINGHOFF

Attesting Officer  Commissioner of Patents and Trademarks